United States Patent [19]
Keene et al.

[11] 3,950,100
[45] Apr. 13, 1976

[54] LASER HETERODYNE SYSTEM

[75] Inventors: Wayne H. Keene, Medfield; Clarke E. Harris, Waltham; Albert V. Jelalian, Bedford; Christopher R. Miller, South Acton; Richard E. Seavey, Newton, all of Mass.

[73] Assignee: Raytheon Company, Lexington, Mass.

[22] Filed: Oct. 29, 1974

[21] Appl. No.: 518,924

Related U.S. Application Data

[63] Continuation of Ser. No. 337,486, March 2, 1973, abandoned.

[52] U.S. Cl. .................................. 356/28; 330/4.3
[51] Int. Cl.² .................... G01P 3/36; H01S 3/00
[58] Field of Search .................. 356/5, 28; 330/4.3; 332/7.51

[56] References Cited
UNITED STATES PATENTS

| | | | |
|---|---|---|---|
| 3,482,184 | 12/1969 | Schneider et al. | 331/94.5 |
| 3,573,463 | 4/1971 | Goodwin et al. | 250/199 |
| 3,730,628 | 5/1973 | Wolcott et al. | 356/5 |
| 3,732,013 | 5/1973 | Hieslmair et al. | 356/28 |

FOREIGN PATENTS OR APPLICATIONS

| | | | |
|---|---|---|---|
| 1,183,492 | 3/1970 | United Kingdom | 356/28 |

*Primary Examiner*—Maynard R. Wilbur
*Assistant Examiner*—S. C. Buczinski
*Attorney, Agent, or Firm*—Richard M. Sharkansky; Milton D. Bartlett; Joseph D. Pannone

[57] ABSTRACT

A laser heterodyne system is disclosed wherein received reflections of a beam of coherent light are amplified in a laser. The amplified received reflections are heterodyned with the light produced by the laser and the resulting beat frequency is detected using a photodetector. A controller, responsive to the beat frequency, controls, in one case, the frequency of a transmitting laser, and hence the frequency of the received light, and, in another case, the frequency of the light produced by the amplifying laser so that, in either case, the difference between the frequency of the received light and the frequency of the light produced by the amplifying laser is adjusted to maximize the amplification of the received light by the amlifying laser prior to detection by the photodetector.

13 Claims, 3 Drawing Figures

LASER HETERODYNE SYSTEM

CROSS-REFERENCE TO RELATED CASES

This is a continuation of application Ser. No. 337,486 filed Mar. 2, 1973, and now abandoned.

BACKGROUND OF THE INVENTION

The invention relates generally to laser heterodyne systems and more particularly to such systems wherein a laser is used to amplify received light prior to detection of the frequency of such light.

As is known in the art, laser heterodyne systems have been used to determine the Doppler velocity of a target. Generally a laser transmits a beam of coherent light towards the target. The beam of light is reflected or scattered by the target and received by the heterodyne system. The frequency of such reflected light is offset from the frequency of the transmitted signal because of the Doppler velocity of the target. A portion of the transmitted light beam together with the received light is fed to a detector means whereby an electrical signal is produced indicative of the Doppler velocity of the target. In many applications, however, the power in the received light is relatively low and inadequate for accurately detecting the Doppler velocity of the target.

In a known heterodyne system the received light is passed through the transmitting laser for amplification prior to being fed to the detector means. That is, the laser is used as a transmitter of a beam of coherent light and simultaneously as a preamplifier for the detector means. The gain (or amplification factor) of the laser is a function of the frequency of the received light. Because the frequency of the received light is related to the Doppler velocity of the target, the preamplifying laser will not provide the most efficient gain for the received light over a range of possible Doppler velocities. Therefore, while the use of a laser for preamplification in the manner just described improves detection of Doppler velocity where the power in the received light is relatively low, in many other applications, as where the frequency of the received light is such that inadequate gain is provided by the amplifier, such technique has been found inadequate for accurately determining the target's Doppler velocity.

SUMMARY OF THE INVENTION

With this background of the invention in mind it is an object of this invention to provide an improved laser heterodyne system wherein a laser is used to preamplify light prior to detection of a frequency characteristic of such light.

It is another object of the invention to provide a laser heterodyne system wherein a laser is used to provide maximum preamplification of received light, the frequency of such light having a wide range.

These and other objects of the invention are attained generally by providing in a laser heterodyne system, a laser for amplifying received light and, a controller means, responsive to the received light, for causing the received light to be amplified with a desired gain.

BRIEF DESCRIPTION OF THE DRAWINGS

The foregoing features of this invention, as well as the invention itself, may be more fully understood from the following detailed description read together with the accompanying drawing, in which.

DESCRIPTION OF THE PREFERRED EMBODIMENTS

Before referring to the FIGURES, it should be noted that the word "light" as used herein refers to any coherent electromagnetic radiation in the ultraviolet, visible, infrared or microwave portion of the spectrum. Further, it should be noted that, for use of exposition, the adaptations of classical telescope configurations normally used with the lasers to define and/or deflect the beam of light from the laser have not been illustrated. Still further, for the reasons just mentioned, conventional appurtenances, such as laser exciters and power supplies, have not been shown. Also, only the light paths which are necessary to understand the invention have been illustrated for the reason mentioned above.

Figure 1:
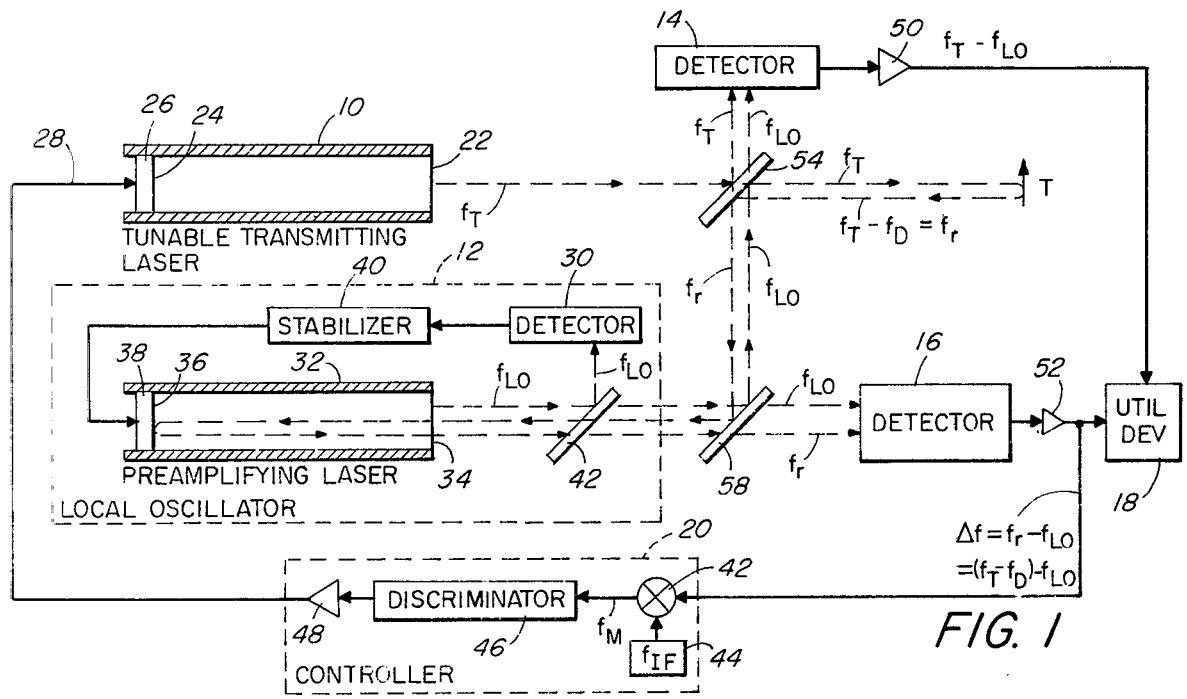
FIG. 1 is a diagrammatical block diagram, greatly simplified, of a first embodiment of a transmit/receive system according to the invention.

Referring now to FIG. 1, a transmit/receive system, here for determining the Doppler velocity of a target, T, is shown to include a tunable transmitting laser 10, a local oscillator 12, photodetectors 14, 16, a utilization device 18 and a controller 20. The tunable transmitting laser 10 here contemplated to be used is a conventional single mode, single frequency $CO_2$ laser which includes mirrors 22, 24 defining the end walls of its optical resonator (not numbered). Mirror 22 is partially transmissive. Mirror 24 is substantially totally reflective and is affixed, in any conventional manner, to a piezoelectric translator 26. Mirror 24 is therefore adapted to slide within the resonator and thereby change the length of such resonator, and hence the frequency of the transmitted light, in response to a voltage applied to such piezoelectric translator 26. Tunable transmitting laser 10 is here operated in the cw mode, although it may equally be operated in a pulsed mode, to transmit a beam of coherent light having a frequency, $f_T$. Such frequency, $f_T$, here has a nominal value of $2.8 \times 10^{13}$ HZ. It is here noted that because the length of the resonator is adapted to change in accordance with the voltage on line 28, such frequency $f_T$ will change from such nominal value in response to such voltage. The reasons for changing the frequency $f_T$ will become apparent. A suitable tunable transmitting laser 10 is a Raytheon model LS-10 laser manufactured by Raytheon Company, Sudbury, Mass.

The Raytheon LS-10 may be characterized by the following parameters:
Reflectivity mirror 22: 80 percent
Reflectivity mirror 24: ≈ 99.8 percent
Radius of curvature mirror 22: ∞
Radius of curvature mirror 24: 4 meters
Cavity length: 1.2 meters
Discharge current: ≈ 20 milliamps
Discharge length: 0.9 meters
2 Brewster windows (not shown): KCl (potassium chloride)
Output power (nominal): 20 watts Gas Mixture (by partial pressure): $CO_2$, 15 percent; $N_2$, 11.5 percent; He, 70 percent; Xe, 3.5 percent.
Gas Pressure: 20 Torr
Temperature: tap water cooled
Bore diameter: 10 millimeters
Aperture diameter: 7 millimeters Photodetectors 14, 16 are any photovoltaic or photoconductive device which produces electrical signals corresponding to the optical signals impressed upon it and are here adapted to respond to light having frequency components up to the order of $2.8 \times 10^{13}$ HZ. Suitable photodetectors are Raytheon Model QKN1545(65) manufactured by Raytheon Company, Special Microwave Device Operation, Waltham, Mass.

Local oscillator 12 includes: a photodetector 30, which here is similar to photodetectors 14, 16 and is here adapted to respond to light having a frequency $2.8 \times 10^{13}$ HZ; a preamplifying laser 32, which here may be identical in construction as tunable transmitting laser 10 with the additional requirement that the power level of the light produced thereby be adjusted to enable proper operation of photodetector 30; a stabilizer 40, which here is a Lock-in Stabilizer Model 80.210 manufactured by Lansing Research Corporation, Ithaca, N.Y.; and, a beam splitting mirror 42 which here is 95 percent transmissive. In operation an exciter (not shown) is actuated in any conventional manner to pump the gas in the optical resonator of preamplifying laser 32. Lasing transitions occur, thereby exciting the optical resonator to produce a beam of coherent light, here 5 percent of which is reflected by beam splitting mirror 42 to photodetector 30. The corresponding electrical signal produced by photodetector 30 is applied to stabilizer 40. Stablizer 40 in turn applies appropriate voltages, including conventional dither voltages, to piezoelectric translator 38 to appropriately adjust the length of the resonator and thereby stabilize the frequency of the coherent light produced in laser 32 to a desired frequency, $f_{LO}$, here $2.8 \times 10^{13}$ HZ.

Controller 20 includes a mixer 42, a reference frequency source 44 and a high voltage amplifier 48, all of conventional design. Reference frequency source 44 produces a signal having an intermediate frequency $f_{IF}$, the value of which will be discussed later. High voltage amplifier 38 produces the voltage on line 28 to drive the piezoelectric translator and thereby change the length of the resonator of laser 10 in a manner to be discussed. Here such amplifier 48 is adapted to produce voltages over the range of 0–2000 volts.

Utilization device 18 is used to display the measured Doppler velocity of the target, T, and includes conventional: Frequency measuring apparatus (not shown) for measuring the frequency of the signals applied thereto; subtracting apparatus (not shown) for subtracting the measured frequencies; and, display apparatus (not shown), as a meter or digital device, for displaying the difference in frequency of the applied signals. (As will become apparent, the difference frequency represents the measured Doppler velocity.)

Completing the transmit/receive system are: A pair of amplifiers 50, 52 which are conventional to filter and amplify a portion of the electrical signals produced by photodetectors 14, 16 respectively; and, a pair of beam splitting mirrors 54, 58 arranged as shown and of conventional construction, here having 50 percent reflectivity.

In operation, an exciter (not shown) is actuated in any conventional manner to pump the gas in the optical resonator of turnable transmitting laser 10. Lasing transitions occur, thereby exciting the optical resonator to produce a beam of coherent light of frequency $f_T$. The beam of coherent light passes through partially transmissive mirror 22. A portion of such light is reflected by beam splitting mirror 54 to photodetector 14 and another portion of such light passes through such beam splitting mirror 54, then through the atmosphere to illuminate targets, as target T. A portion of the coherent beam of light is reflected back from target T and received by the transmit/receive system. Such received light has a frequency, $f_r$, which, because of the Doppler velocity of target T may be represented by $f_r = f_T - f_D$; where $f_D = (2V f_T/C)$, $V$ = Doppler velocity of target, T; and, $C$ = speed of light. The received light is reflected by beam splitting mirrors 54 and 58 and then passes through beam splitting mirror 42 and partially transmissive mirror 34 into the optical resonator of preamplifying laser 32. After multiple reflections between mirrors 34, 36, a portion of such received light passes through partially transmissive mirror 34, and beam splitting mirrors 42, 58 to photodetector 16.

Further, because of the operation of local oscillator 12, a beam of coherent light of frequency $f_{LO}$ is produced by preamplifying laser 32. A portion of such light is reflected by beam splitting mirror 42 to photodetector 30 for stabilization of local oscillator 12 in the manner described above. (It is noted that while a portion of the received light is also reflected by beam splitting mirror 42 to photodetector 30, the power in such portion of the received light is significantly lower than the power in the light produced by preamplifying laser 32 and therefore it may be considered that the photodetector 30 responds only to the light from preamplifying laser 30.) A second portion of the light of frequency $f_{LO}$ passes through beam splitting mirrors 42 to beam splitting mirror 58. One portion thereof is reflected by beam splitting mirror 58 and passes through beam splitting mirror 54 to photodetector 14 and another portion thereof passes through beam splitting mirror 58 to photodetector 16. It follows then that the signal passed by amplifier 50 is a beat frequency signal, having a frequency $f_T - f_{LO}$, which results from the heterodyning of the transmitted light and the light produced by preamplifying laser 32. Such beat frequency signal is applied to utilization device 18. Likewise, the signal passed by amplifier 52 is a beat frequency signal, having a frequency $\Delta f = f_r - f_{LO} = (f_T - f_D) - f_{LO}$, which results from the heterodyning of the received light and the light produced by preamplifying laser 32. This later beat frequency signal is applied to utilization device 18 and to controller 20. Therefore, the difference in the frequency of the signals passing through amplifiers 50, 52 represents the Doppler velocity, V, of the target, T. Such velocity is here displayed by utilization device 18.

Figure 3:
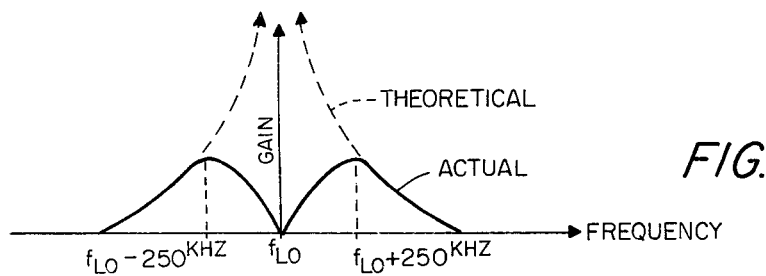
FIG. 3 is a graph showing the theoretical and actual gain of the laser amplifier in FIGS. 1 and 2 as a function of the frequency of the light being amplified therein.

Before describing the operation of controller 20, reference is made to FIG. 3 and the effect of preamplifying laser 32 on the received light. We have determined that the amount of gain (or amplification) provided by preamplifying laser 32 to the received light is a function of the frequency of such received light, $f_r$, relative to the frequency of the light produced in such amplifying laser, $f_{LO}$. While, theoretically, the maximum gain provided by such laser to the received light occurs when the frequency of such received light is at the frequency $f_{LO}$, such maximum gain has been found to actually occur at a frequency offset from $f_{LO}$. While the reasons for this are not fully understood, it is believed such occurrence of maximum gain is caused by saturation effects within the laser.

The frequency where the maximum gain of the received light is attained may be determined by the following calibration of "tuning" procedure. Using a spinning wheel or other such well known device to simulate a constant Doppler velocity target, the frequency $f_{IF}$ is adjusted while observing the amplitude (or power) in the beat frequency signal passing through amplifier 52. Such observation may be made using a conventional spectrum analyzer (not shown). When the amplitude of the beat frequency signal reaches a maximum, the frequency $f_{IF}$ is fixed and the system is thereby calibrated or tuned. For the Raytheon model LS-10 laser the frequency where the gain is maximum was found to be offset from $f_{LO}$ by 250 KHZ. It has also been found that there is an "offset" about each one of the $CO_2$ transition frequencies of the laser. Typically the separation between $CO_2$ transition frequencies is about $50 \times 10^9$ HZ. However, because the lasers used herein are single mode, single frequency lasers only one $CO_2$ transition frequency, here $f_{LO}$, is shown in FIG. 3.

Referring again to FIG. 1, the frequency of the received light is offset from $f_{LO}$ by 250 KHZ, here 250 KHZ higher than the frequency $f_{LO}$, by adjusting the frequency, $f_T$, of the tunable transmitting laser 10 to thereby adjust the frequency $f_r$ according to $f_r - f_{LO} = \Delta f = 250$ KHZ. To put it another way, the frequency, $f_r$, of the transmitted light is adjusted to maintain the frequency of the beat frequency signal, $\Delta f$, 250 KHZ, (i.e. $f_T = 250$ KHZ $+ (f_D + f_{LO})$.

This adjustment in the frequency of the transmitted light is here implemented by controller 20. Such controller responds to the beat frequency signal out of amplifier 52 to translate the piezoelectric translator 26 in the resonator of tunable transmitting laser 10 and thereby appropriately change the length of the resonator and hence the transmitted light frequency, $f_T$. In particular, the frequency $f_{IF}$ of the signal produced by reference signal source 44 is selected such that the frequency of the signal out of mixer 42, $f_M = \Delta f - f_{IF}$, will cause the discriminator 46 to produce a zero volt output signal when $\Delta f = 250$ KHZ. Therefore, once the frequency $f_{IF}$ is selected and fixed, deviations in the beat frequency, $\Delta f$, of the beat frequency signal from 250 KHZ because of changes in the target's Doppler velocity will cause appropriate deviations of the frequency $f_M$ with the proper voltage level being developed on line 28 to properly position the piezoelectric translator 26 within the resonator and thereby cause the frequency $f_T$ of the transmitted light to be equal to 250 KHZ $+ (f_D + f_{LO})$. Once this adjustment in transmitted light frequency is made the beat frequency, $\Delta f$, will be 250 KHZ.

Figure 2:
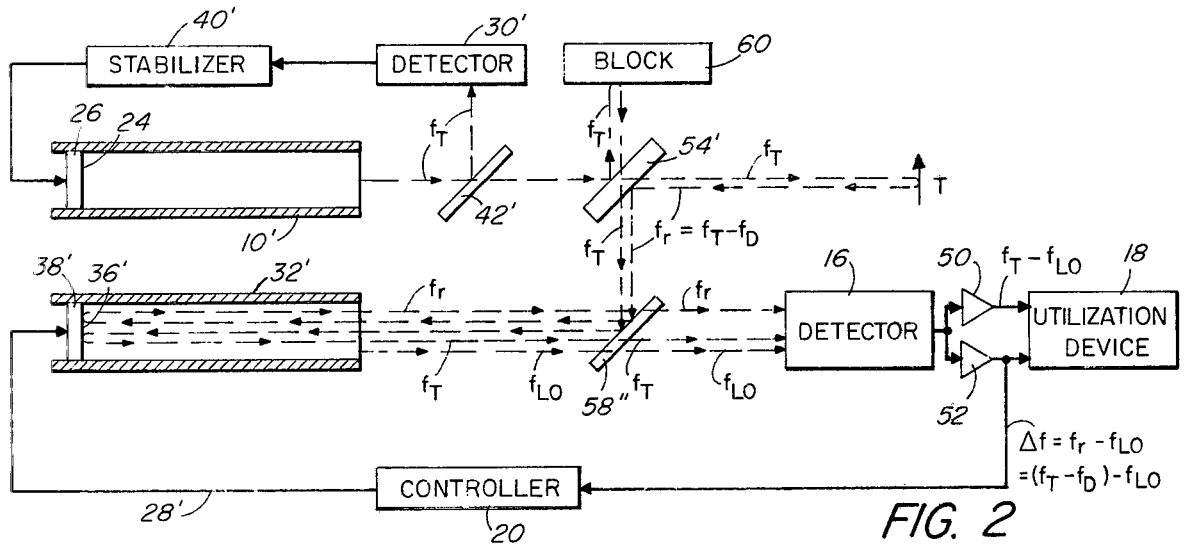
FIG. 2 is a diagrammatical block diagram, greatly simplified, of an alternative embodiment of the type of system illustrated in FIG. 1.

Referring now to FIG. 2 a transmit/receive system is shown wherein the transmitting laser 10' is frequency stablized by means of beam splitting mirror 42', photodetector 30' and stabilizer 40' in a manner equivalent to that of local oscillator 12 (FIG. 1) and the resonator of tunable preamplifying laser 32' is adjusted in accordance with the Doppler velocity of the target T in a manner equivalent to that of tunable transmitting laser 10 (FIG. 1) to enable maximum amplification of the received light by the preamplifying laser 32'. It should be noted that elements common to the embodiments shown in FIG. 1 and FIG. 2 are similarly numbered and the equivalent elements are similarly numbered with the addition of a prime (') notation. It should also be noted that the system shown in FIG. 2 is particularly suited for applications wherein maximum power is desired for the transmitting laser 10. In the system shown in FIG. 2 a portion of light transmitted by transmitting laser 10', here having a frequency stabilized at $2.8 \times 10^{13}$ HZ, passes through beam splitting mirror 54' to target T and another portion of such light is reflected by such beam splitting mirror and suitable energy absorbing block 60 (such block having only about 1 percent reflectively) to the resonator of tunable preamplifying laser 32'. After multiple reflections therein a portion of the transmitted light passes through beam splitting mirror 58' to photodetector 16. Reflections of the transmitted light from target T are received by the transmit/receiver system. Such received light has a frequency $f_r = f_T - f_D$ because of the Doppler velocity of target, T. The received light is reflected by beam splitting mirrors 54'. and 58' to the resonator of tunable preamplifying laser 32' wherein it is amplified thereby. After being amplified the received light passes through beam splitting mirror 58' to photodetector 16. Light, produced by tunable preamplifying laser 32' and having a frequency $f_{LO}$, passes through beam splitting mirror 58' to photodetector 16. It follows then that because of heterodyning the signal passed by amplifier 50 has a beat frequency $f_T - f_{LO}$ and the signal passed by amplifier 52 has a beat frequency $\Delta f = f_R - f_{LO} = (f_T - f_D) - f_{LO}$. As described in FIG. 1, the controller produces an output voltage, here on line 28', when the beat frequency, $\Delta f$, is other than 250 KHZ. Therefore, the length of the resonator of tunable preamplifying laser 32' with the maximum available gain.

Referring again to FIG. 1 it is noted that a portion of the received light (not shown), after passing through preamplifying laser 34, will be reflected by beam splitting mirror 58 to photodetector 14. Therefore, in addition to the beat frequency signal of frequency $f_T - f_{LO}$ there will be additional signals, one of frequency $f_T - f_r$ and another one of frequency $f_{LO} - f_r$. However, the beat frequency signal is distinguishable from the additional signals because the power in such beat frequency signal is generally significantly larger than the power in the additional signals.

Referring to the photodetector 16 (FIG. 2), in addition to the beat frequency signals of frequency $f_T - f_{LO}$ and $f_r - f_{LO}$, there will be an additional signal of frequency $f_T - f_r$. The additional signal may be distinguished from the beat frequency signals by the following initial calibration procedure. Using a spinning wheel to simulate a constant Doppler velocity target, the frequency of the preamplifying laser 32' is changed and the output of photodetector 16 is observed with a spectrum analyzer (not shown) which may be part of the utilization device 18. The frequency components of the signal at the output of such photodetector which change accordingly will be the beat frequency signals $f_r - f_{LO}$ and $f_T - f_{LO}$ (such signals being distinguishable from each other by their relative power mentioned above). The frequency component of the signal at the output of photodetector 16 which does not change accordingly will be thereby identified as the additional signal of frequency $f_T - f_r$. When the power in the received light is relatively large an additional step in the calibration procedure (which is also applicable to the system in FIG. 1) is to change the Doppler velocity of the simulated target while maintaining the frequencies $f_T$ and $f_{LO}$ relatively fixed. Therefore, the signal of frequency $f_r - f_{LO}$ will change accordingly while the signal of frequency $f_T - f_{LO}$ will remain fixed, thereby enabling distinction between each one of such signals.

Having described preferred embodiments of the invention, it will now be apparent to one of skill in the art that changes may be made without departing from the inventive concepts. For example, the difference between the frequency of the received light and the frequency of the light produced by the amplifying laser may vary for each type of such laser and thereby be a frequency other than 250 KHZ. Likewise, the preamplifying laser may have been operated at a frequency lower than the frequency of the light produced thereby, $f_{LO}$. Further, the beam splitting mirrors 54, 54' may be replaced by an active transmit/receive switch or a passive polarization device. Also, the received light may pass through preamplifying laser 32 (FIG. 1) rather than be extracted from the same end the light entered (with a corresponding change in the location of photodetector 16). Still further, photodetector 14 (FIG. 1) may be replaced by a block such as block 60 (FIG. 2) and likewise block 60 (FIG. 2) may be replaced by a photodetector as photodetector 14 (FIG. 1). It is felt, therefore, that the invention should not be restricted to its disclosed embodiments, but rather should be limited only by the spirit and scope of the appended claims.

What is claimed is:

1. In combination:
   a. laser means for producing a beam of coherent light having a frequency $f_1$, and for amplifying light having a frequency $f_2$; and
   b. means for controlling said amplification by adjusting the difference between the frequency $f_1$ and the frequency $f_2$ to a predetermined frequency and comprising means for maximizing the amplification of the light having the frequency $f_2$.

2. The combination recited in claim 1 including additionally a transmitting laser means for producing a beam of coherent light having a frequency $f_3$ relating to the frequency $f_2$.

3. The combination recited in claim 2 wherein the adjusting means includes means for generating an error voltage representative of a signal having a frequency equal to the difference between the frequency $f_1$ and the frequency $f_2$.

4. The combination recited in claim 3 wherein the adjusting means includes means for controlling the frequency $f_1$.

5. The combination recited in claim 3 wherein the adjusting means includes means for controlling the frequency $f_2$.

6. The combination recited in claim 3 wherein the laser means includes a resonator and the adjusting means includes means for varying the size of the resonator.

7. The combination recited in claim 3 wherein the transmitting laser means includes a resonator and the adjusting means includes means for varying the size of the resonator of the transmitting laser means.

8. In a laser heterodyne system wherein a coherent beam of light having a frequency $f_1$, such frequency being related to the Doppler velocity of a target, is amplified in a laser, such laser producing a beam of light having a frequency $f_2$, and a detector is provided to produce an electrical signal representative of the heterodyning of the amplified beam of light having the frequency $f_1$ and the produced beam of light having the frequency $f_2$, such signal having a frequency component $\Delta f = |f_2 - f_1|$, the improvement comprising:
   a. means for producing a control signal representative of the difference between the frequency $\Delta f$ and a predetermined frequency, $f_3$;
   b. means, responsive to the control signal, for adjusting the frequency difference $|f_2 - f_1|$ to cause such frequency difference to be equal to the frequency $f_3$; and
   c. means for enabling substantially all of the light impinging on the detector having the frequency $f_1$ to pass through the laser prior to passing onto such detector.

9. A laser heterodyne system comprising:
   a. transmitting laser means for producing a coherent beam of light of frequency $f_T$ and for directing such beam of light toward a target whereby a portion of such light is reflected by the target;
   b. preamplifying the laser means, for producing a beam of coherent light at a resonant frequency $f_{LO}$ and for amplifying the light reflected by the target, such reflected light having a frequency $f_r$, such frequency $f_r$ being related to the frequency $f_T$ by the Doppler velocity of the target;
   c. detector means for producing a beat frequency signal, such signal being representative of the heterodyning between the produced beam of light at the frequency $f_{LO}$ and the amplified beam of light;
   d. controller means, responsive to the beat frequency signal, for adjusting the difference between the frequency $f_{LO}$ and the frequency $f_r$ to a predetermined value.

10. The heterodyne system recited in claim 9 wherein the controller means includes means for adjusting the resonant frequency of the transmitting laser means.

11. The heterodyne system recited in claim 9 wherein the controller includes means for adjusting the resonant frequency of the preamplifying laser means.

12. The laser heterodyne system recited in claim 9 including means for enabling substantially all of the light directed to the detector means having a frequency $f_r$ to pass through the preamplifying laser means prior to passing onto such detector means.

13. In combination:
   a. laser means having an active medium for producing a beam of coherent light of frequency $f_1$;
   b. detector means for producing a beat frequency signal representative of the difference between the frequencies of light directed thereon;
   c. means for directing the beam of coherent light of frequency $f_1$ onto said detector means and for directing a beam of coherent light of frequency $f_2$ onto such detector means, including means for enabling substantially all of the light impinged on the detector means having a frequency $f_2$ to pass through the active medium prior to passing onto such detector means; and
   d. means for adjusting the difference between the frequency $f_1$ and the frequency $f_2$.

* * * * *